Sept. 10, 1968     J. R. BEDE     3,400,904
AIRFOIL CONSTRUCTION
Filed Dec. 19, 1966
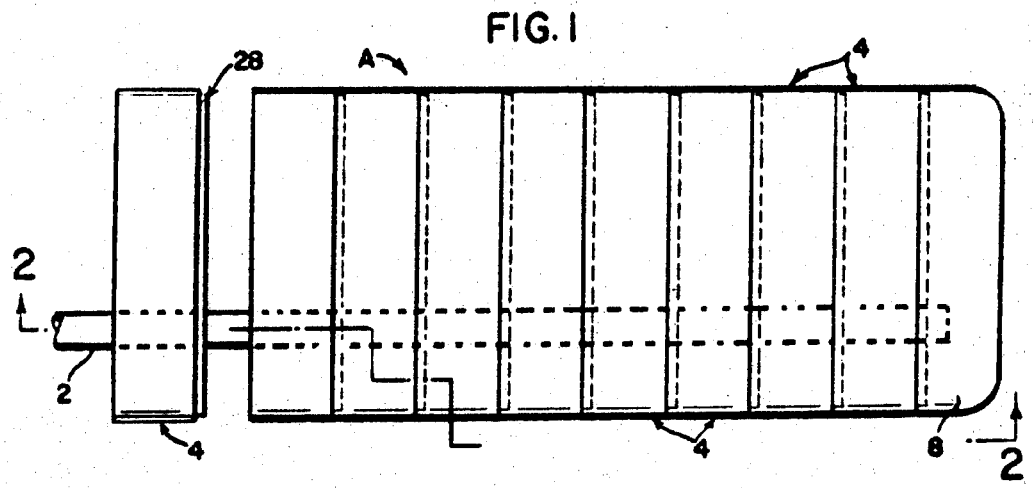
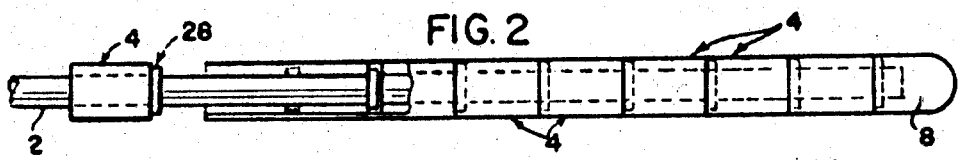
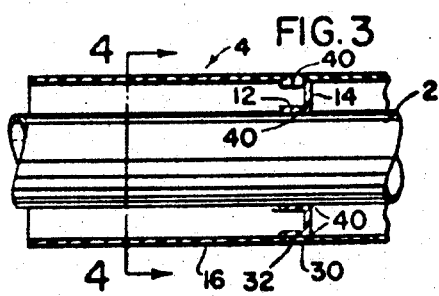
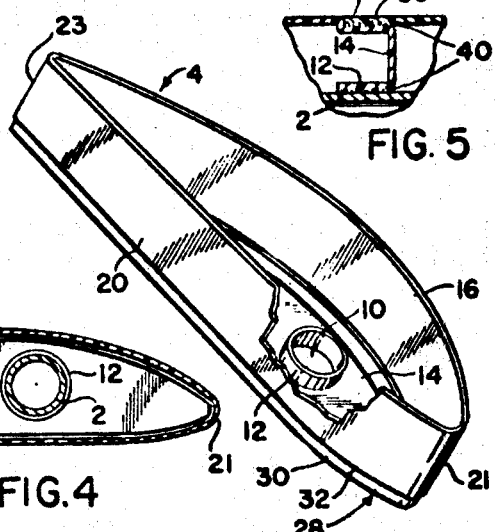
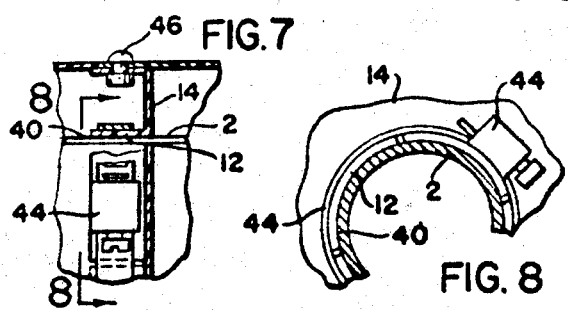
INVENTOR.
JAMES R. BEDE
BY
*Meyer, Tilberry & Body*
ATTORNEYS United States Patent Office 3,400,904
Patented Sept. 10, 1968

3,400,904
AIRFOIL CONSTRUCTION
James R. Bede, 355 Richmond Road,
Cleveland, Ohio 44124
Filed Dec. 19, 1966, Ser. No. 602,993
3 Claims. (Cl. 244—124)

ABSTRACT OF THE DISCLOSURE

An airplane wing structure including a longitudinally extending spar member of uniform cross-section throughout its longitudinal extent and a plurality integral, rib and skin-forming sections positioned longitudinally of the spar and surrounding relationship thereto. Each of the rib and skin-forming sections include a rib portion having an outer periphery of a configuration corresponding to the desired cross-section of the wing and a flanged opening adapted to closely receive the spar. An integrally formed skin-forming portion extends completely around a periphery of each rib portion and generally perpendicular thereto. Each end of the skin-forming portions are formed so as to permit the ends to mate with the opposite end of the next adjacent rib and skin-forming section. The elements are joined to form a rigid wing by having the mating portions of rib and skin-forming sections connected to each other, and flanges of the rib portions connected to the spar by adhesive bonding means.

---

The present invention pertains to the art of airfoils and, more particularly, to an improved airplane wing structure.

The invention is particularly applicable for constructing an airplane wing having a configuration referred to as a rectangular wing platform, and will be discussed with particular reference thereto; however, it is to be appreciated that the invention is capable of broader application and could be used for constructing wings of a variety of configurations.

As is well-known, an aircraft wing must meet unusual weight and stress requirements. Not only must the wing be light in weight, but it must also be capable of withstanding high torsional and bending loads in addition to the normal air loads.

The prior art has generally met these requirements by the use of complex structures consisting of a large number of relatively small parts interrelated in a confusing maze. For example, one of the constructions commonly used utilizes an I-beam type spar. This provides good load carrying capabilities in an up and down direction but requires the addition of a second spar tied together with the first as a box by the use of intermediate drag wires to permit the structure to carry torsional loads. Generally, with this type structure the skin becomes a shear web for carrying part of the torsional load. As a consequence, when openings are cut through the skin to permit landing lights, inspection plates, etc., to be installed in the wing, stringers and bulkheads must be added to make up for the skin strength lost.

As can be readily seen, a structure such as described above presents a number of problems and disadvantages. For example, because of the large number of small load carrying members, the labor involved in designing and constructing such a structure becomes excessive. Further, the jigs necessary for constructing the wing must be very complex and highly accurate. Also, because of the large number of members criss-crossing throughout the interior of the wing, space, which could otherwise be used for housing various accessories and fuel tanks, is effectively lost.

The present invention overcomes these and other problems inherent with prior wing structures, and provides a wing structure which is highly simplified and easy to assemble.

In accordance with the present invention a wing structure is provided comprising a longitudinally extending spar member and a plurality of integral rib and skin forming sections. The rib and skin forming sections are positioned longitudinally of the spar member in surrounding relationship thereto, with each section joined to the spar member and to the next adjacent section.

In accordance with another aspect of the present invention an integral skin and rib forming section for use in constructing an airplane wing is provided. This section comprises a rib forming portion having an outer periphery corresponding to the desired wing cross section, and a flanged spar receiving opening extending therethrough. Formed integrally with the rib portion and completely around its outer periphery is a substantially perpendicularly extending skin forming portion. The ends of the skin forming portion are formed so as to mate with the end of another such section when the sections are positioned on a spar in adjacent relationship.

The primary object of the present invention is the provision of a wing structure which can be constructed without the use of complex jig structures and with a minimum of labor.

A further object is the provision of a wing construction which can be sold in kit form and easily assembled by the home craftsman.

Another object is the provision of a wing structure that is simply constructed yet exhibits load carrying abilities equal to prior art wing constructions.

Yet another object is the provision of a wing structure that can be constructed from a plurality of identically-shaped members, thus reducing the number of different parts necessary to the minimum.

Another object of the present invention is the provision of an integral rib and skin forming section which can be formed by a simple molding operation.

A still further object is the provision of wing structure that can be constructed from a plurality of members that can be formed by molding, stamping, casting, or extruding, thereby eliminating expensive forming and machining operations.

These and other objects and advantages will become apparent from the following description used to illustrate the preferred embodiment of the invention as read in connection with the accompanying drawings in which:

FIGURE 1 is a plan view of an airplane wing formed according to the present invention;

FIGURE 2 is a view, partially in section, taken on line 2—2 of FIGURE 1;

FIGURE 3 is an enlarged view of a portion of the cutaway section of FIGURE 2;

FIGURE 4 is a cross-sectional view taken on line 4—4 of FIGURE 3;

FIGURE 5 is an enlarged detail view showing the use of glue or resin to connect the skin and rib forming sections to each other and the spar;

FIGURE 6 is a pictorial view of one of the integral skin and rib forming sections used to form the wing illustrated in FIGURE 1;

FIGURE 7 is a detail view showing alternate methods of joining the integral skin and rib forming sections to each other and the spar;

FIGURE 8 is a cross-sectional view taken on line 8—8 of FIGURE 7.

Referring now to the drawings wherein the showings are for the purpose of illustrating a preferred embodiment of the invention only and not for the purpose of limiting same, FIGURE 1 shows a plan view of an airplane wing constructed according to the present invention. In general, wing A comprises main load carrying spar member 2, a plurality of identical integral skin and rib forming sections 4, and a wing tip section 8.

The primary load carrying member of the present construction comprises an elongated spar member 2 which extends substantially the entire length of the wing. This member is designed to carry substantially all of the bending, torsional and back loads to which the wing is subjected. It could obviously be of many shapes and either solid or hollow. However, as shown in the preferred embodiment, it comprises an aluminum tube of uniform circular cross section.

Connected along the longitudinal extent of spar 2 and in surrounding relationship thereto are a plurality of integral skin and rib forming sections 4. In the present design these sections are designed to carry only the normal air loads. However, by forming them of higher grade material they could be expected to carry a portion or even all of the bending and torsional loads. The configuration of sections is such that they can be readily formed from any suitable material by a molding, casting or stamping operation. In the preferred embodiment they are molded of glass fibers in a resinous base, although it is apparent a variety of other materials possessing the requisite strength could be used.

As best shown in FIGURE 6, each skin and rib forming section 4 is generally cup shaped, and comprises a bottom or rib forming section 14 with an upstanding wall or skin forming section 16 integral therewith. In the particular embodiment shown, each of the wing forming sections 4 are identical and when joined together in a manner to be subsequently described form what is commonly known as a rectangular wing platform. This identity of sections 4 permits an entire wing to be constructed with members formed by a single die or mold, thus greatly reducing the cost of producing a wing. Although it would require a plurality of different dies or molds, it is apparent that wings of any desired taper or twist could be produced according to the invention.

Formed in the bottom or rib of each skin and rib forming section 4 is an aperture 10. This aperture is of a size and configuration to fit relatively snugly about spar 2. Extending upwardly about aperture 10 is a wall or flange 12. This flange provides means for connecting the skin and rib forming section 4 to spar 2, and also serves to transmit the torsional or twisting loads to spar 2.

Extending upwardly from the outer edge of bottom or rib section 14 is the outer wall or skin forming section 16. Skin forming section 16 extends entirely around rib 14 and forms a top airfoil surface 18, leading edge surface 21, lower airfoil surface 20, and trailing edge 23. A recess 28 comprised of surfaces 30, 32 is formed around the lower edge of skin section 16. This recess is sized so that the top edge of the adjacent section fits around, or mates with it, to form a smooth outer airfoil surface.

As can be seen from the foregoing description of skin and rib forming section 4, an integral rib and skin section results that is extremely simple to manufacture and which possesses the required strength and aerodynamic configuration.

It is a relatively simple matter to construct a complete wing by the use of the described skin and rib forming sections. The preferred method of forming a wing by the present invention is to first position the spar member horizontally and apply any adhesive having the required holding properties, such as an epoxy resin glue 40, around the outer surface of spar 2 at the location at which a skin and rib forming section 4 is to be mounted (see FIGURE 5). Next, one of the sections 4 is slid on the spar and positioned so its flange 12 is over adhesive 40. Although tests have shown that the adhesive alone provides the requisite strength, it is preferable to increase the strength of the joint by additionally applying a clamp 44 about flange 12 to more firmly join the section to the spar (see FIGURES 7 and 8).

The above steps are repeated with a second section 4 being placed on the spar in the same manner as the first. The first and second sections are joined at their mating recess by coating their contacting surfaces with adhesive 40. Additionally, it would be possible to join these sections by the use of conventional connectors such as screws or rivets 46, as shown in FIGURE 7. In fact, any type of connector which would properly transfer shear loads from one skin section to another could be used. The above steps are repeated continuously until the desired wing length is achieved.

Although it forms no part of the present invention, ailerons or control surfaces can be provided by trimming away the trailing edge 23 at the desired location and inserting a separate spar section to support the necessary hinge structure, etc. Alternately, it would be possible to mold a secondary aileron supporting spar into the wingrib sections.

In view of the above description, it can be seen that an extremely simple wing structure is achieved with a minimum of labor and without the use of complex jigs. Further, the resulting wing structure does not require the usual drag wires, false ribs, stringers, etc. For this reason, a large amount of open spaced remains within the wing. This allows the wings to be used as fuel tanks or as housings for auxiliary components. Additionally, because of the simplicity of the construction the wing is ideal for the "kit" or home-built type aircraft. The ease with which the wings can be assembled without jigs makes the construction substantially foolproof for the person desiring to build his own aircraft.

The invention has been described in great detail sufficient to enable one skilled in the art of airfoil construction to duplicate the invention. Obviously, modifications and alterations of the preferred embodiment described will occur to others upon a reading and understanding of this specification and it is my intention to include all such modifications and alterations as part of my invention insofar as they come within the scope of the appended claims.

Having thus described my invention, I claim:

1. An airplane wing structure comprising:
   a longitudinally extending spar member in the form of a metal tube of uniform cross-section throughout its longitudinal extent;
   a plurality of integral rib and skin-forming sections positioned longitudinally of said spar and surrounding relationship thereto;
   each of said rib and skin-forming sections including a rib portion having an outer periphery of a configuration corresponding the desired cross-section of the wing and a centrally positioned flanged opening adapted to closely receive said spar, an integrally formed skin-forming portion extending completely around said periphery of said rib portion and generally perpendicular thereto, each end of said skin-forming portion being formed so as to permit said end to mate with the opposite end of the next adjacent rib and skin-forming section; and,
   adhesive bonding means connecting each section to said spar and to the next adjacent section.

2. The airplane wing structure as defined in claim 1 wherein said rib and skin-forming sections are formed from glass fibers in a resin base.

3. The airplane wing structure as defined in claim 1 wherein said rib and skin-forming sections are further connected to said spar by clamp means extending about said flanged opening.

References Cited

UNITED STATES PATENTS 2,988,152 6/1961 Katzenberger et al. -- 170—159
3,321,019 5/1967 Dmitroff et al. ------ 170—159

FOREIGN PATENTS 320,365 10/1929 Great Britain.
630,222 10/1949 Great Britain.

MILTON BUCHLER, *Primary Examiner.*

J. PITTENGER, *Assistant Examiner.*